(No Model.)
H. A. MOYER.
SPRING VEHICLE.
No. 357,781. Patented Feb. 15, 1887.
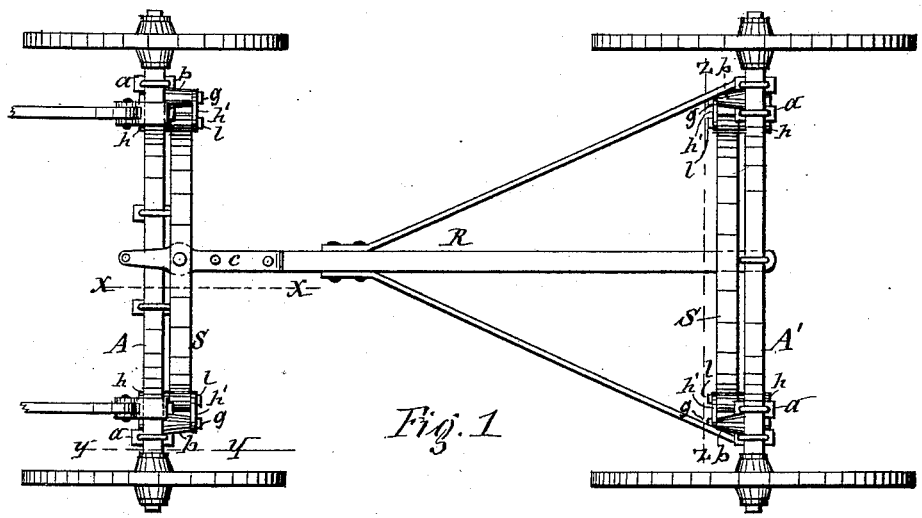
Fig. 1
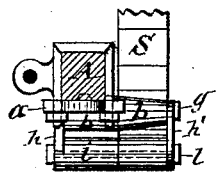
Fig. 3
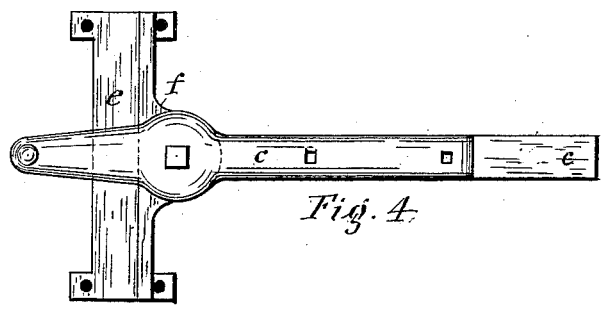
Fig. 2
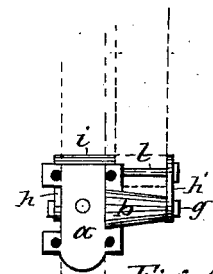
Fig. 5
Fig. 4
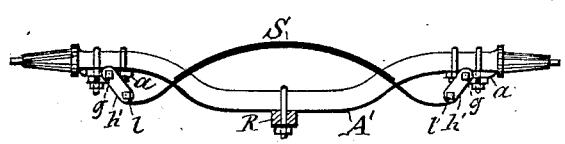
Fig. 6
WITNESSES:
C. Bendixon
H. P. Denison
INVENTOR:
Harvey A. Moyer
BY
Duell, Laass & Duell
ATTORNEYS

UNITED STATES PATENT OFFICE.

HARVEY A. MOYER, OF SYRACUSE, NEW YORK.

SPRING-VEHICLE.

SPECIFICATION forming part of Letters Patent No. 357,781, dated February 15, 1887.

Application filed November 11, 1886. Serial No. 218,033. (No model.)

*To all whom it may concern:*

Be it known that I, HARVEY A. MOYER, of Syracuse, in the county of Onondaga, in the State of New York, have invented new and useful Improvements in Spring-Vehicles, of which the following, taken in connection with the accompanying drawings, is a full, clear, and exact description.

This invention relates to the class of spring-vehicles which have cross-springs hung on the sides of the axle, and has special reference to the vehicle for which I have obtained Letters Patent of the United States No. 292,036, dated January 15, 1884.

My present invention consists, first, in improved means for hanging the cross-spring on the side of the axle, whereby the connection of said parts is rendered more secure; and, secondly, in novel devices for connecting the reach with the forward axle at a point in a vertical line from the pivot of the head-block in the center of the spring hung to the side of the axle, as aforesaid, whereby torsional strain on the king-bolt is obviated, all as hereinafter more fully described, and specifically set forth in the claims.

In the annexed drawings, Figure 1 is a plan view of the running-gear of a vehicle embodying my improvements. Figs. 2 and 3 are enlarged longitudinal sections taken, respectively, on lines $x$ $x$ and $y$ $y$ in Fig. 1. Fig. 4 is an enlarged detached view of the coupling-irons by which the reach is connected with the forward axle. Fig. 5 is an enlarged detached view of the coupling-iron by which the spring is hung on the side of the axle; and Fig. 6 is a transverse section on line $z$ $z$, Fig. 1.

Similar letters of reference indicate corresponding parts.

A and A' represent, respectively, the forward and rear axles of the vehicle, connected by the reach R; and S S denote the cross-springs, hung, respectively, on the rear of the forward axle and on the front of the rear axle.

The connection of the reach with the forward axle I have heretofore made in the center of said axle, and the result was that when the forward axle was cramped a torsional strain was exerted on the coupling-pin of the reach and on the king-bolt located out of range with said coupling-pin. To obviate this defect I now employ a clip-tie, $e$, clipped to the under side of the central portion of the forward axle, and formed with a rigid rearward projection, $f$, which abuts against the rear of the axle, so as to be braced thereon. The projection $f$ is provided with an eye which is in a vertical line from the king-bolt, which pivots the head-block C on the center of the spring S. To the top and bottom of the forward end of the wooden portion of the reach R, I firmly secure two metallic straps, $c$ $c$, which are extended forward and across the top and bottom of the projection $f$ and axle A, and are coupled together at a suitable distance from the front of the axle. Said straps are provided with perforations corresponding to the eye in the projection $f$, and by a bolt, $d$, passing through the same the reach is coupled to the axle at a point in a vertical line from the king-bolt, which pivots the head-block on the center of the cross-spring.

Some difficulty has been experienced to obtain the requisite stability for the hangers by which the spring is hung on the side of the axle, and to overcome this difficulty I clip onto the under side of the end portions of the axle clip-ties $a$ $a$, each of which has integral with it or is formed with a rigid sleeve, $b$, extending across the bottom of the clip-tie at right angles to the axle and projecting at one side of the latter. Longitudinally through the said sleeve passes a bolt, $g$, and to opposite ends of said bolt are connected two links, $h h'$. The link $h$, which is adjacent to the axle, has integral with it a supplemental sleeve, $i$, which projects across the axle and terminates under the opposite side thereof, and longitudinally through the supplemental sleeve $i$, and through the free end of the other link, $h'$, passes a coupling-bolt, $l$. The usual eye on the end of the spring is of the same width as the space between the end of the supplemental sleeve $i$ and link $h'$, into which space the eye of the spring enters, and through said eye passes the coupling-bolt $l$.

It will be observed that by the rigid sleeve $b$, I obtain a long and firm bearing for the bolt $g$, and thus the spring has a more secure support.

Having described my invention, what I claim as new, and desire to secure by Letters Patent, is—

1. In combination with the axle and cross-spring, the clip-tie *a*, secured to the under side of the axle, and having integral with it the sleeve *b*, extending across the bottom of said clip-tie and projecting laterally from one side of the axle, the bolt *g*, extending through said sleeve, the link *h*, hung on the said bolt at the side of the axle, and having integral with it the sleeve *i*, terminated under the opposite side of the axle, the link *h'*, hung on the bolt *g* at the free ends of the sleeve *b*, the bolt *l*, passing through the sleeve *i* and free end of the link *h'*, and the coupling-eye of the spring connected to the bolt *l* between the sleeve *i* and link *h'*, substantially as described and shown.

2. In combination with the forward axle, cross-spring hung to the rear side of said axle, and head-block pivoted at the center of said spring, a rearward projection on the axle, and the reach pivoted to said projection in a perpendicular line from the pivot of the head-block, substantially as specified and shown.

3. The combination, with the forward axle, cross-spring hung to the rear side of said axle, and head-block pivoted at the center of said spring, of a clip-tie secured to the under side of the axle and formed in one piece with a rearward projection abutting against the rear of the axle, and the reach pivoted to said projection in a vertical line from the pivot of the head-block, substantially as described and shown.

In testimony whereof I have hereunto signed my name and affixed my seal, in the presence of two attesting witnesses, at Syracuse, in the county of Onondaga, in the State of New York, this 4th day of November, 1886.

HARVEY A. MOYER. [L. S.]

Witnesses:
 H. P. DENISON,
 C. BENDIXON.